(No Model.)

C. L. CROWELL.
HOLDBACK HOOK.

No. 298,070. Patented May 6, 1884.

Witnesses;

Rich⁴. A. Goldsbrough

J. M. Wells.

Inventor,

Chauncy L. Crowell, per A. B. Upham,

Attorney in fact.

UNITED STATES PATENT OFFICE.

CHAUNCY L. CROWELL, OF PEORIA, ILLINOIS.

HOLDBACK-HOOK.

SPECIFICATION forming part of Letters Patent No. 298,070, dated May 6, 1884.

Application filed February 13, 1884. (No model.)

*To all whom it may concern:*

Be it known that I, CHAUNCY L. CROWELL, of Peoria, in the county of Peoria, in the State of Illinois, have invented an Improved Holdback-Hook; and I do hereby declare that the following is a full, clear, and exact description thereof, reference being had to the annexed drawings, making a part of this specification, in which like letters of reference refer to like parts, and in which—

Figure 1:
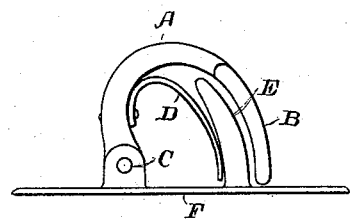
Figure 3:
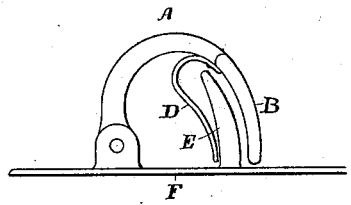
Figure 2:
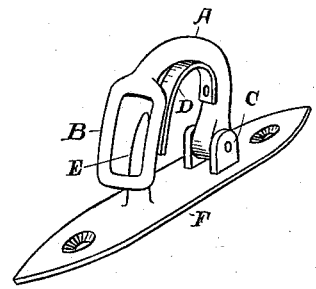
Figure 4:
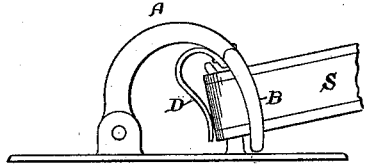

Figure 1 represents a side elevation; Fig. 2, a perspective view; Fig. 3, a varied form; Fig. 4, a view showing a strap in place therein.

The object of this invention is the construction of a holdback-hook that shall automatically detach itself from the holdback-strap when the latter is pulled forward by the passage of the horse out from between the shafts of the vehicle.

My device for this purpose consists of the hook E, cast as a part of the plate F, the curved shank A, having rectangular eye B and pivotal connection C to said plate, and of the curved spring D, riveted or otherwise fastened to said shank A. The plate F is adapted to be fastened to the upper side of the shaft of the vehicle. Between the bosses C, projecting from said plate, one end of the shank A is pivoted, and at its other end is the rectangular eye B. The hook E projects from the plate F just behind the eye B when the latter is down, and both the hook E and said eye B are curved approximately concentric with the pivot of the shank A. In fastening a holdback-strap to this hook, the eye B is raised above the hook E, and the loop of such strap S inserted into said eye. On lowering the eye B the hook E enters the loop of the strap and the same is fast. To prevent the rattling of this holdback-hook, which would be exceedingly annoying, I provide the curved spring D, one end of which is riveted or otherwise fastened to the shank A or its eye B, and the other end of which presses against the hook E. When the strap S is in place in this holdback-hook, the said spring D presses tightly against said strap, and prevents it from moving and the shank A and eye B from rattling. When the horse leaves the shafts after his traces have been unhitched, the holdback-strap raises the eye B upward until the hook E is below the same, when said strap withdraws from said eye, and the horse is entirely free. There are of course two of such holdback-hooks, one on each shaft of the vehicle.

I am aware that holdback-hooks have previously been made in which the hook projected from a plate to which was pivoted a shank having at its free end a rectangular eye. I do not therefore claim, broadly, such a hook; but What I do claim as my invention is as follows:

In a holdback-hook of that kind in which a plate, F, has a hook, E, projecting therefrom and pivoted thereto, a curved shank, A, provided with a rectangular eye, B, at the free end thereof, the combination, with such a plate, hook, shank, and eye, of the spring D, riveted or otherwise secured at one end to said shank, and adapted to so impress a strap held by the holdback-hook as to prevent rattling of the same, as set forth.

In testimony that I claim the foregoing invention I have hereunto set my hand this 2d day of February, 1884.

CHAUNCY L. CROWELL.

Witnesses:
JAMES M. MORSE,
WILLIAM F. DICKISON.